Patented July 5, 1932

1,865,880

UNITED STATES PATENT OFFICE

MAX OBERLIN, OF DARMSTADT, GERMANY

PROCESS FOR THE PRODUCTION OF NORMAL LEVOROTATORY 1-(PARA-AMINOPHENYL)-2-METHYLAMINO-PROPANOL-1

No Drawing. Application filed July 19, 1930, Serial No. 469,266, and in Germany March 11, 1930.

In my copending application Serial No. 469,265 a process is described for the production of the normal 1-(paraaminophenyl)-2-methylamino-propanol-1. According to the present invention it has been found that in the same way the normal levorotatory 1-(paraaminophenyl)-2-methylamino-propanol-1 may be produced, when using the normal levorotatory 1-phenyl-2-methyl-amino-propanol-1 as starting material. In order to carry out the process the starting material is treated either with nitric acid (sp. g. 1,4) or with a mixture of nitric and sulfuric acid (sp. g. 1,8); care must be taken not to exceed a temperature of the reaction mixture of $+30°$ C. This can be done by any of the well known methods of cooling.

The so formed raw normal levorotatory 1 - paranitrophenyl) - 2 - methylamino - propanol-1 is separated and transformed to the corresponding amino-compound by any of the well known methods of reducing nitro-groups. The reduction may be carried out e. g. by hydrogen in statu nascendi (produced by any well known manner, e. g. by the addition of a metal to an acid) or by molecular hydrogen in connection with the use of catalysts, etc. In the following example a way to carry out the process of the present invention may be described.

Example 100 parts of normal levorotatory 1-phenyl-2-methylamino-propanol-1 are added to a mixture of 150 volume parts each sulfuric acid (1,8) and nitric acid (1,4). The mixture is cooled in such a way that the temperature during the nitration does not exceed $30°$ C. After solution has taken place the mixture is poured on 250 parts of ice, whereby crystallization is effected. After about 2 hours the mixture is sucked off, washed at first with a little ice-water, afterwards with alcohol-ether and finally dried by means of a vacuum or by applying a temperature not exceeding $100°$ C. Yield 70-80 parts of raw-nitrate. If this product is oxidized it yields para-nitro-benzoic acid, whereby is proved that the para-nitro compound has been formed. The raw nitro-nitrate is reduced in alcoholic solution in presence of a palladium-catalyst at a temperature of about $50°$ C. After a bit more than the theoretical amount of hydration has been taken up, the solution is sucked off from the catalyst and distilled in a vacuum. The remains are dissolved in water and the base is freed by the addition of strong caustic soda and extracted with ether. After the etheric solution has been dried it is evaporated and the separation of the base begins. The mixture is allowed to settle, whereby the free base crystallizes out in form of very long and very thin white needles. After some recrystallizations from ether the normal levorotatory 1-(paraaminophenyl)-2-methylamino-propanol-1 is obtained which melts at 54–56°. The hydrochloric salt of this base forms a fine white-yellowish crystal-powder of a melting point of 206–208°. The optical rotation of a watery solution of 1% of this monochlorhydrate is $$[\alpha]_D^{20°} = -39,5°.$$

I claim:

1. Process for the production of normal levorotatory 1-(paraaminophenyl)-2-methylamino-propanol-1 consisting in the treatment of a salt of normal levorotatory 1-phenyl-2-methylamino-propanol-1 with nitric acid of sp. g. 1,4 in mixture with sulfuric acid (sp. g. 1,8); care being taken that the temperature does not exceed $30°$ C; separating the so formed raw product and reducing it by one of the wellknown methods of reduction, finally transforming the salt into the free base.

2. As a new and useful compound normal levorotatory 1-(paraaminophenyl)-2-methylamino-propanol-1 showing a melting point of 54–56°, being easily soluble in water, alcohol and chloroform, difficultly soluble in ether, insoluble in petrol-ether; the hydrochloric salt of the new compound, forming a white-yellowish crystal-powder, being easily soluble in water, moderately soluble in alcohol, insoluble in ether, showing furthermore an optical rotation of $$[\alpha]_D^{20°} = -39,5°$$

in an aqueous solution of 1%.

In testimony whereof I have hereunto signed my name.

MAX OBERLIN.